United States Patent Office 3,550,327
Patented Dec. 29, 1970

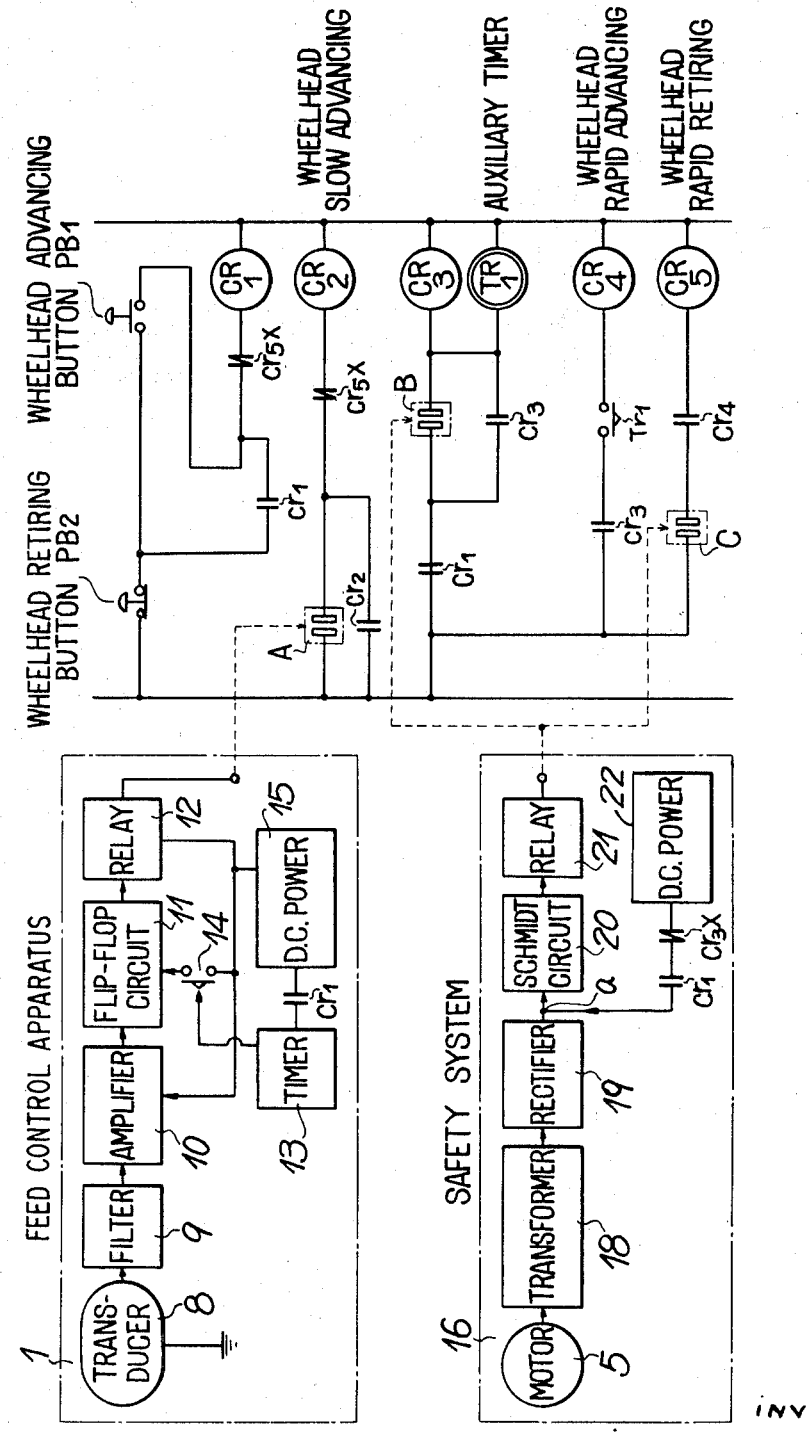

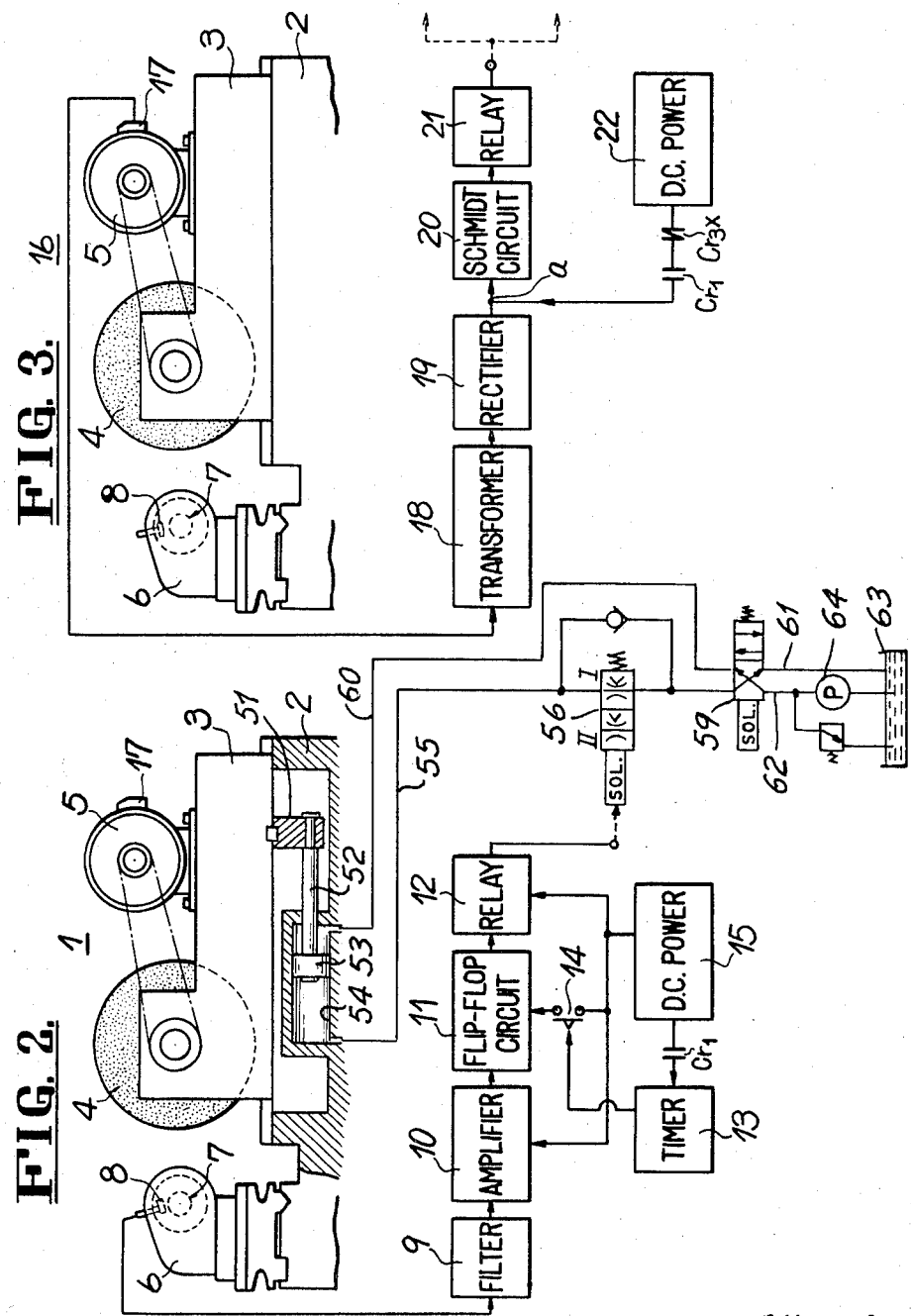

3,550,327
FEED CONTROL APPARATUS WITH A SAFETY DEVICE
Takeshi Kusakabe, Kenji Suzuki, and Kimio Kano, Asahimachi, Aichi Prefecture, Japan, assignors to Toyoda Machine Works Ltd., Karya, Aichi Prefecture, Japan
Filed Aug. 7, 1967, Ser. No. 658,707
Claims priority, application Japan, Aug. 11, 1966, 41/52,956
Int. Cl. B24b 49/00
U.S. Cl. 51—165                                4 Claims

ABSTRACT OF THE DISCLOSURE

This disclosure is concerned with a feed control apparatus with a safety system, whereby idle cutting time is eliminated automatically by utilizing the semi-conductor transducer whose principle is based upon the piezo-electric characteristics and the machine tool, particularly grinding machine, provided with the device is free from any trouble by means of the manner that a tool, particularly grinding wheel, will not advance toward a workpiece before the device has been confirmed to function normally or return instantaneously when the device is checked to function abnormally or not to function at all even during cutting feed.

BACKGROUND OF THE INVENTION (1) Field of the invention

This invention concerns the field of art of the machine tool, particularly the grinding machine. This invention would be classified into Class 51 in the U.S. patent classification.

(2) Description of the prior art

It has been well known, for example, by the specification of a Japanese patent entitled "A Method of the Gap Eliminating," of which patent application publication number is 26669 of 1965, that a machine tool is provided with a feed control apparatus comprising a semi-conductor transducer attached to a portion of the machine tool, which is capable of sensing the specified vibration waves generated at the moment that a tool of the machine tool contacts with a workpiece, this transducer generating an output voltage by sensing the vibration and the specified vibration waves being picked up among the output voltages and arranged to change feed speed of a tool head.

However, there is such a drawback that, if the feed control apparatus is out of order, rapid feed speed of the tool head is not changed to cutting feed speed even upon arrival of the tool at the workpiece and consequently the workpiece is machined at the rapid feed speed, resulting in that it may happen to damage the tool and/or the workpiece and to injure the operator.

SUMMARY OF THE INVENTION

Briefly stated in accordance with one aspect of this invention, there is provided a feed control apparatus with safety system for the machine tool, the grinding machine, having a tool head, or a wheelhead in the grinding machine. The device has a semi-conductor transducer attached to a portion on the machine tool, which is able to sense the specified vibration waves generated at the moment that a tool of the machine tool contacts with a workpiece, this transducer generating an output voltage by sensing the vibration waves, whereby feed speed of the tool head is arranged to be changed, and the safety system being arranged to let the tool head return quickly for protecting the machine tool when the device is out of order. The safety system is arranged to be actuated by the abnormal input voltage of a motor, driving the tool, generated when the tool is fed into contact with the workpiece. In addition, the safety system is designed to be actuated by pushing the button for advancing a tool head and to transmit a signal when the safety system is actuated normally, and the tool head begins to advance upon reception of the signal.

In accordance with this invention, it is possible to eliminate automatically the idle cutting time. In case that the feed control apparatus is out of order, the safety system finds out it instantaneously and the tool head, the wheelhead in grinding machine, is made to return rapidly. Consequently it is possible to prevent the machine tool equipped with the feed control apparatus from such dangerous accidents that the tool and the workpiece are damaged and the operator is injured.

This invention has the advantage that the safety system can find out quickly whether the workpiece is loaded precisely between centers, and that, if not, the safety system makes the tool head return rapidly at the moment of its arrival at the workpiece. Consequently, the workpiece is prevented from being ground with tapered shape.

The invention will be understood well, and other objects and additional advantages of the invention will become clear upon perusal of the following description taken in connection with the accompanying drawings.

BRIEF DESCRIPTION OF THE DRAWING

In the accompanying drawing, FIG. 1 is a circuit diagram of an embodiment of this invention;

FIG. 2 is a block diagram of the feed control apparatus shown in FIG. 1; and

FIG. 3 is a block diagram of the safety system for the feed control apparatus shown in FIG. 1.

DESCRIPTION OF THE PREFERRED EMBODIMENT

Referring more particularly to the drawings, the preferred embodiment of this invention will now be described; however, this description in which this invention is embodied in a grinding machine, will be understood to be illustrative of the invention and not as limiting it to the particular application shown and described. There is a feed control apparatus 1 as shown in FIG. 1. This feed control apparatus 1 is equipped on a conventional grinding machine comprising a bed 2, on which a wheelhead 3 is slidably longitudinally mounted, on which a grinding wheel 4 and a motor 5 for driving the wheel 4 are carried. A table is mounted slidably traversely on the bed 2, on which a foot stock 6 is mounted fixedly, to which a workpiece 7 is fixed.

The wheelhead 3 is provided with a dependent block 51 which is joined with an end of a piston rod 52. The other end of the piston rod 52 is provided with a piston 53 adapted to be slidable in a cylinder 54. The piston 53 and the cylinder 54 make up a hydraulic reciprocatory actuator which effects to move the grinding wheel 4 rotatably mounted on the wheelhead 3 towards and from the workpiece 7. A fluid passage 55 led from the left end of the actuator is connected to a solenoid actuated reversing valve 56 having two kinds of restrictors, i.e. restrictors for rapid feed and for slow feed, and thence, to a reversing valve 59. Another passage 60 led from the right end of the actuator is connected to the reversing valve 59. The reversing valve 59 is operated by a solenoid and may change direction of the fluid flow through the passages 55 and 60 so that the wheelhead 3 is moved towards and away from the workpiece 7 by virtue of the hydraulic reciprocatory actuator. A pair of passages 61 and 62 are extended from the valve 59 to a fluid reservoir 63. A pump 64 provided intermediate the passage 62 is adapted to supply the fluid from the reservoir 63 to the actuator.

The feed control apparatus 1 comprises a semi-conductor transducer 8 attached to the foot stock 6. This transducer 8 is capable of generating an output by sensing vibration waves of a portion of the machine, which may be exemplified by the piezo-electric element such as the crystal of barium titanate. Where the transducer 8 is to be attached to is not limited to the foot stock 6 but the transducer 8 may be attached to other parts of the machine tool which can sense the vibration waves generated when the tool is fed into contact with the workpiece. The place suitable for attaching the transducer 8 is exemplified by such a work holder as the center or the fixture and such a tool holder as the wheelhead or the cutter holder. Specified vibration waves in voltage generated when the workpiece 7 contacts with the grinding wheel 4 are picked up by a filter 9 among various vibration waves sensed by the transducer 8. The selected vibration waves are amplified by an amplifier 10. The amplified vibration waves are converted into a binary signal by a flip-flop circuit 11. By this signal is energized a relay 12. When the relay 12 is energized by the action of the flip-flop circuit 11, a feed speed reversing valve for the wheelhead 3 is changed over so that the wheelhead feed speed is converted from a longitudinal rapid feed to a longitudinal cutting speed.

The amplifier 10, the flip-flop circuit 11, and the relay 12 are connected with respective direct power. A contact 14 of a timer 13 is inserted between the flip-flop circuit 11 and the direct current power 15 and, during the contact 14 is broken, the flip-flop circuit 11 does not function and the relay 12 does not function. The timer contact 14 is inserted on the following ground. It is intended to prevent the feed control apparatus 1 from an erroneous behaviour derived from such an abnormal vibration as a noise of the wheelhead advancing relay which is actuated when a button for advancing wheelhead is pushed on the grinding machine. Such abnormal vibration may be defined as the other vibrations than those derived from the contact of the wheel with the workpiece. To this end, it is intended to let the feed control apparatus 1 await at the nearest position of the wheel to the workpiece 4. This timer 13 is connected with the direct current power 15 across a normally opened contact $cr1$ which will be referred to hereinafter, so that when the contact $cr1$ is closed, the timer 13 is energized.

Referring to FIG. 3, a safety system 16 will be described in detail. Numeral 18 denotes a current transformer which functions to lower the input alternating current voltage branched from the power terminal of the grinding wheel driving motor 5 mounted on the wheelhead 3 down to a determined value. The lowered alternating current voltage supplied from the transformer 18 is rectified by a rectifier 19 and then impressed to a Schmitt circuit 20. When the Schmitt circuit 20 is impressed by a current in excess of a set value for the circuit, the same is actuated so as to make the relay 21 energized. The input side of the Schmitt circuit 20 is also connected with a direct current power 22 across the above-stated normally opened contact $cr1$ and a normally closed contact $cr3x$ which will be referred to hereinafter.

When the motor 5 is apparently unloaded or when the grinding wheel 4 is not in contact with the workpiece 7, the motor 5 is slightly loaded so that the input might be small. Accordingly the Schmitt circuit 20 is not actuated. If the feed control apparatus 1 becomes out of order in such a manner that the grinding wheel 4 is fed into contact with the workpiece 7 for starting grinding the latter as the wheel 4 has the rapid feed speed, the motor 5 is suddenly over-loaded resulting in the Schmitt circuit being actuated by the sudden increased current so as to energize the relay 21 whereby the wheelhead 3 is returned so as to protect the feed control apparatus 1.

In addition, any fault in the safety 16 by itself may be checked. As referred to hereinafter, the normally opened contact $cr1$ is closed in cooperation with pushing operation of the button for advancing wheelhead PB1 so that a branch circuit $a$ is impressed with a sum of the input for the unloaded period and the direct current power 22 whereby the Schmitt circuit 20 and the relay 12 are energized. Now if the transformer 18 and/or the rectifier 19 are are out of order, the Schmitt circuit 20 and the relay 21 are deenergized due to the absence of the input for the unloaded period in the branch 2. If the Schmitt circuit 20 is out of order by itself, it is natural that the relay 21 is deenergized. Accordingly, if the relay 21 is energized in cooperation with the pushing operation of the button PB1 for advancing wheelhead, the fact that the safety system 16 by itself is in order may be confirmed.

In accordance with this invention, as shown in FIG. 1, the structure of this embodiment is arranged to be actuated in such a manner that the wheelhead 3 may be advanced after the action of the relay 21 has been confirmed or whether the safety system 16 by itself is in order or not. That is to say, if the safety system 16 is out of order by itself, the wheelhead 3 can not be advanced. In FIG. 1, symbols CR1, CR2, CR3, CR4 and CR5 denote relays, respectively. Symbols $cr1$, $cr2$, $cr3$, and $cr4$ denote normally opened contacts for corresponding relays, respectively. Symbol $cr3x$ denotes a normally closed contact for the relay CR3. Symbol $cr5x$ denotes a normally closed contact for the relay CR5. Symbol TR1 denotes an auxiliary timer having a contact $tr1$. Symbol A denotes a normally opened contact adapted to be closed by a signal transmitted by the relay 12 of the feed control apparatus 1. Symbols B and C denote normally opened contacts adapted to be closed by a signal transmitted by the relay 21 of the safety system 16.

In operation, when all active elements have been restored to respective original positions and the button PB1 for advancing wheelhead is pushed, the relay CR1 is energized across the contact $cr5x$ and held as it is by virtue of the holding contact $cr1$. When the relay CR1 is energized, the contact $cr1$ of the feed control apparatus 1 is closed, across which the timer 13 is impressed with the voltage of the direct current power 15 so as to be energized. At the same time, also the contact $cr1$ of the safety system 16 is closed by the action of the relay CR1, so that the branch circuit $a$ is impressed with a sum of the input for the unloaded wheel driving motor 5 and the direct current power 22 impressed across the contact $cr3x$ and $cr1$. The sum is in excess of the set current for the Schmitt circuit 20 so that the Schmitt circuit 20 is actuated whereby the relay 21 is energized, of which signal closes the contacts B and C. When the contacts B is closed, the relay CR3 is energized across the contacts $cr1$ and B and held as energized by the holding contact $cr3$. At the same time, the auxiliary timer TR1 is energized. Furthermore, the normally closed contact $cr3x$ of the safety system 16 is opened in accordance with the energization of the relay CR3 so that the voltage of the direct current power 22 impressed to the branch circuit $a$ is interrupted at the contact $cr3x$ whereby the contacts B and C are opened. When time is up in the auxiliary timer TR1, the contact $tr1$ is closed so that the relay CR4 is energized across contacts $cr3$ and $tr1$ whereby the rapid feed of the wheelhead 3 is started.

As above described in detail, the rapid feed of the wheelhead 3 is started by the signal representing the normal behaviour of the safety system 16 (or the closure of the contact B), hence it is confirmed whether the safety system 16 by itself is in order or not. If the safety system 16 by itself is out of order, the contact B is not closed so that the wheelhead is not advanced rapidly.

When the wheel 4 has been advanced near to the workpiece 7, time is up in the timer 13 so as to close the contact 14 whereby the feed control apparatus 1 is changed to be ready to act. While in this condition, when the wheel 4 is fed into contact with the workpiece 7, the transducer 8 senses instantaneously the specified vibration waves generated by the contact of the wheel 4 with the workpiece 7, whereby the relay 12 is energized across the filter 9, amplifier 10, and the flip-flop circuit 11, of which a signal closes the contact A. Accordingly, the relay cr2 is energized across the contacts A and cr5x and held by means of the holding contact cr2, whereby the rapid feed speed of the wheelhead 3 is converted to the slow feed speed and the workpiece 7 is ground by the grinding wheel 4. If the feed control apparatus 1 is out of order so that the contact A is not closed and the grinding operation of the workpiece 7 is done at the rapid feed speed as it is, the load on the wheel 4 is increased so that the input for the wheel driving motor 5 is instantaneously increased up to an excess of the set value for the Schmitt circuit 20 whereby the Schmitt circuit 20 and, in turn, the relay 21 are energized, of which a signal closes the contacts B and C. When the contact C is closed, the relay CR5 is energized across the contacts C and cr4, so that the wheelhead 3 is rapidly returned to the original position as the protective behaviour.

By the energization of the relay as described above, the normally closed contact cr5x is opened so that the relays CR1 and CR2 are deenergized whereby the contacts cr1 and cr2 are opened so that the relays CR3 and CR4, the auxiliary timer TR1, and the timer 13 are all deenergized.

While a particular embodiment of the invention has been illustrated and described, modifications thereof will readily occur to those skilled in the art. It should be understood therefore that the invention is not limited to the particular arrangement disclosed but that the appended claims are intended to cover all modifications which do not depart from the true spirit and scope of the invention.

What is claimed as new and desired to be secured by Letters Patent of the United States is:

1. A feed control apparatus for a machine tool having an electric motor driven grinding wheel rotatably mounted on a wheel head, comprising a transducer attached to a portion of the machine tool and adapted to produce electric signals when said portion is vibrated upon bringing said grinding wheel into contact with a workpiece, valve means capable of changing the feed rate of the grinding wheel, relay means being operably connected to said valve means, a switching circuit for energizing said electric relay means in response to said electric signals to change the feed rate of the grinding wheel, a transformer adapted to produce an electric current proportional to a load applied to the electric motor for driving said grinding wheel, and a Schmitt circuit responsive to said electric current when the same surpasses a predetermined value so as to produce an electric signal which stops further feed movement of the grinding wheel towards the workpiece.

2. A feed control apparatus for a machine tool having an electric motor driven grinding wheel rotatably mounted on a wheel head as claimed in claim 1, including an amplifying means for amplifying the first-named electric signals, and a flip-flop circuit for changing the amplified electric signals into binary signals to control said relay means.

3. A feed control for a machine tool having an electric motor driven grinding wheel rotatably mounted on a wheel head as claimed in claim 2, wherein said flip-flop circuit is connected to a power source across a contact operated by a timer which is energized later than the moment in which a signal is given to begin a machining cycle of the machine tool.

4. A feed control apparatus for a machine tool having an electric motor driven grinding wheel rotatably mounted on a wheel head as claimed in claim 2, including a power source connected to said Schmitt circuit to apply an electric current only at the moment in which a signal is given to begin a machining cycle of the machine tool.

References Cited

UNITED STATES PATENTS

| | | | |
|---|---|---|---|
| 2,168,596 | 8/1939 | Hall | 51—111 |
| 2,866,301 | 12/1958 | Koulicovitch et al. | 51—165 |
| 2,961,808 | 11/1960 | Dunigan | 51—165 |
| 2,984,952 | 5/1961 | Gebel | 51—165 |

LESTER M. SWINGLE, Primary Examiner